United States Patent
Abevi et al.

(10) Patent No.: US 10,018,257 B2
(45) Date of Patent: Jul. 10, 2018

(54) ROLLER SCREW MECHANISM AND ASSOCIATED MANUFACTURING METHOD

(71) Applicants: Folly Abevi, Chambéry (FR); Eric Allegri, Montmélian (FR)

(72) Inventors: Folly Abevi, Chambéry (FR); Eric Allegri, Montmélian (FR)

(73) Assignee: AKTIEBOLAGET SKF, Gothenburg (SE)

( * ) Notice: Subject to any disclaimer, the term of this patent is extended or adjusted under 35 U.S.C. 154(b) by 385 days.

(21) Appl. No.: 14/864,933

(22) Filed: Sep. 25, 2015

(65) Prior Publication Data
US 2016/0091067 A1    Mar. 31, 2016

(30) Foreign Application Priority Data

Sep. 29, 2014 (FR) ...................................... 14 59199

(51) Int. Cl.
F16H 25/00 (2006.01)
F16H 25/22 (2006.01)

(52) U.S. Cl.
CPC ............................... F16H 25/2252 (2013.01)

(58) Field of Classification Search
CPC .................................................. F16H 25/2252
See application file for complete search history.

(56) References Cited

U.S. PATENT DOCUMENTS

| | | | | |
|---|---|---|---|---|
| 4,470,646 A * | 9/1984 | Fuchsluger | ............. | F16C 19/50 384/550 |
| 4,591,313 A * | 5/1986 | Miyatake | ............. | B64C 11/306 416/127 |
| 7,000,495 B2 * | 2/2006 | Benoit | ................ | F16H 25/2252 74/424.89 |
| 7,686,125 B2 * | 3/2010 | Andersson | ........... | B62D 5/0427 180/407 |
| 8,082,818 B2 * | 12/2011 | Sugitani | .............. | F16H 25/2252 74/424.91 |
| 2004/0069084 A1 * | 4/2004 | Dubus | ................. | F16H 25/2252 74/424.92 |
| 2005/0160856 A1 * | 7/2005 | Sugitani | .............. | F16H 25/2252 74/424.92 |
| 2010/0269616 A1 * | 10/2010 | Merlet | ................ | F16H 57/0497 74/424.92 |

FOREIGN PATENT DOCUMENTS

| | | |
|---|---|---|
| EP | 0049788 A2 | 4/1982 |
| EP | 1918612 A1 | 5/2008 |
| JP | 2007162744 A | 6/2007 |

* cited by examiner

*Primary Examiner* — David M Fenstermacher
(74) *Attorney, Agent, or Firm* — Bryan Peckjian; SKF USA Inc. Patent Dept.

(57) ABSTRACT

A roller screw mechanism comprises a screw having an outer thread and a nut disposed around and coaxially with the screw. The nut comprises an inner thread. A plurality of rollers are disposed radially between the screw and the nut; each roller being provided with an outer thread engaged with the outer and inner threads of the screw and of the nut and with two outer gear teeth. The mechanism also comprises two synchronizing gear teeth that are each engaged with one of the gear teeth of the rollers. An outside diameter of each gear teeth of each roller is less than a diameter of a root of the thread of the roller. Each tooth of the gear teeth of the rollers comprises planar faces that engage with the synchronizing gear teeth.

10 Claims, 6 Drawing Sheets

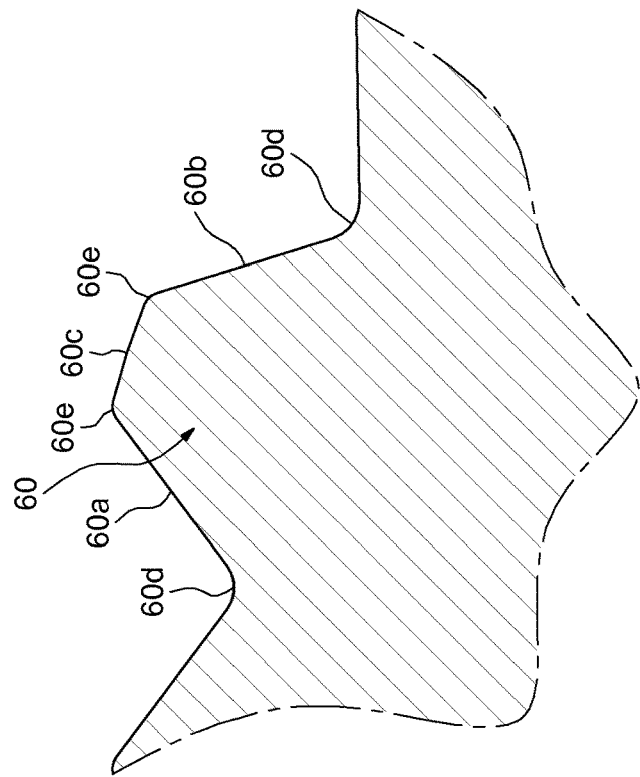

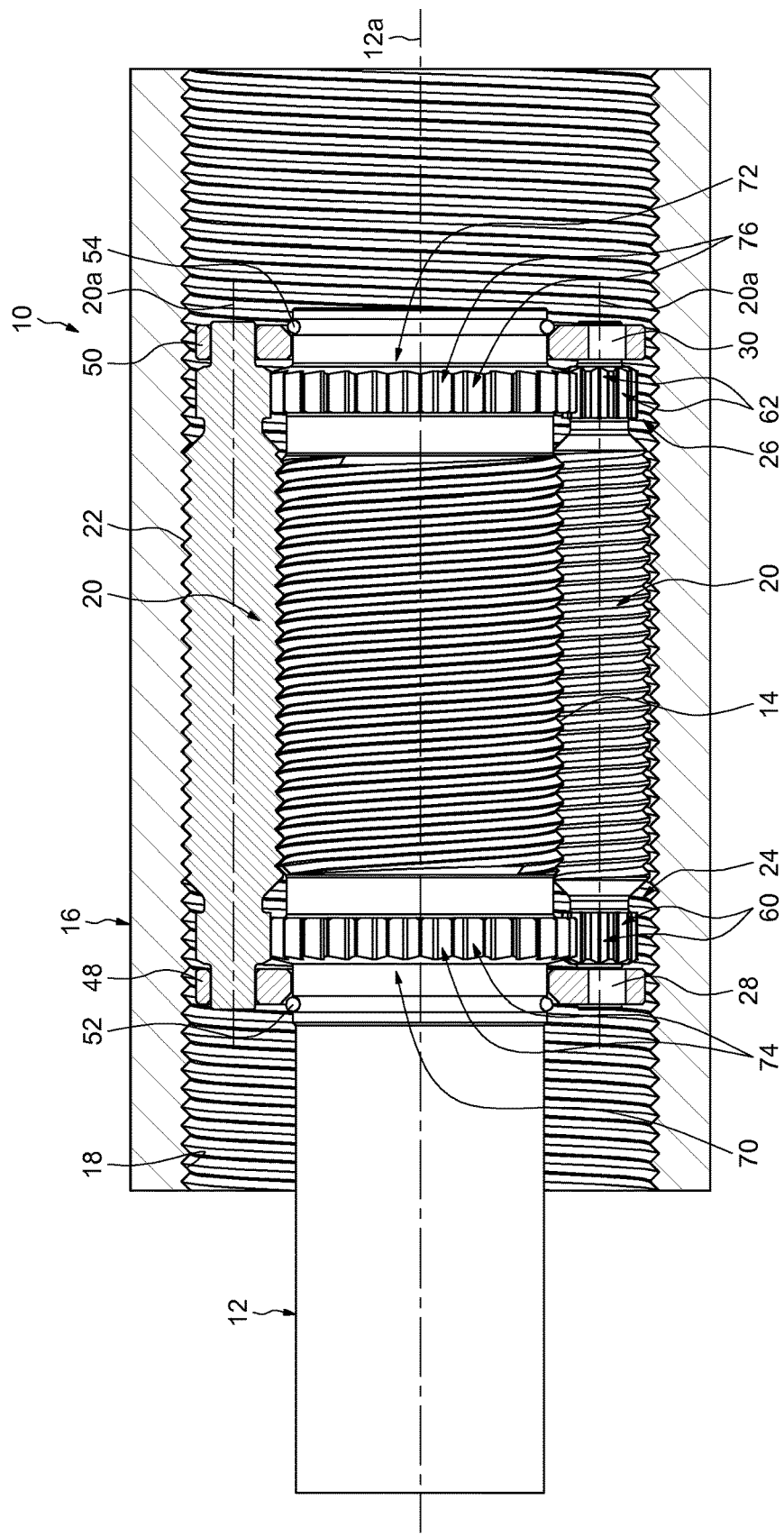

ROLLER SCREW MECHANISM AND ASSOCIATED MANUFACTURING METHOD

CROSS REFERENCE TO RELATED APPLICATION

This is a Non-Provisional Patent Application, filed under the Paris Convention, claiming the benefit of France (FR) Patent Application Number 1459199, filed on 29 Sep. 2014 (29.09.2014), which is incorporated herein by reference in its entirety.

FIELD OF THE INVENTION

The present invention relates to the field of roller screw mechanisms for converting a rotational movement into a linear translational movement, and vice versa.

BACKGROUND OF THE INVENTION

Such a mechanism is provided with a screw comprising an outer thread, with a nut disposed around the screw and comprising an inner thread, and with a plurality of longitudinal rollers that have an outer thread engaged with the outer and inner threads of the screw and of the nut.

In a first type of roller screw mechanism, the threads of the rollers and the thread of the nut have helix angles that are identical to one another and different from that of the thread of the screw, such that, when the screw rotates with respect to the nut, the rollers rotate on themselves and roll around the screw without moving axially inside the nut. The rollers are guided in rotation parallel to the axis of the screw by way of ring gears that are fitted in a non-threaded part of the nut and comprise inner synchronizing gear teeth engaged with outer gear teeth of the rollers. Such a mechanism is referred to as a planetary roller screw.

A second type of roller screw mechanism has a similar operating principle, but differs by way of an inverted disposition. The helix angles of the threads of the rollers, of the screw and of the nut are chosen such that, when the screw rotates with respect to the nut, the rollers rotate on themselves about the screw and move axially in the nut. The rollers are guided in rotation by outer synchronizing gear teeth that are formed on the screw and engage with the gear teeth of the rollers. Such a mechanism is referred to as an inverted roller screw.

With the current design of these mechanisms, during machining operations that are carried out in order to form the outer thread of each roller, the thread-cutting tool cuts the outer gear teeth previously machined at each end of the roller. The thread is thus also present on the gear teeth of each of the rollers, generally in the useful region of the gear teeth that is provided for the transmission of forces and is located between the head radius and the clearance radius of the teeth.

During this transmission of forces, given the presence of these threads on the gear teeth of the rollers, the contact pressure exerted by the gear teeth on the synchronizing gear teeth provided on the nut, or on the screw, is relatively high in the useful region of the gear teeth of the rollers. This causes premature wear to the synchronizing gear teeth.

Furthermore, given the profile in the form of an involute of a circle of the gear teeth of each roller, these gear teeth are conventionally produced by milling. This makes it necessary to provide a relatively large clearance for the axially acting milling cutter axially between each gear teeth of the roller and the outer thread. The axial size of each clearance is directly linked to the radius of the milling cutter. For a given length of the roller, this clearance formed at each end limits the length of the outer thread that can be provided on the roller and thus the loading capacity and the radial and axial rigidities of the associated mechanism. Moreover, with such a profile in the form of an involute of a circle, sharp edges are present on the gear teeth of each roller. In operation, this also helps to create a high contact pressure on the synchronizing gear teeth provided on the nut, or on the screw, in the useful region of the gear teeth of the rollers.

SUMMARY OF THE INVENTION

The present invention seeks to overcome these drawbacks.

More particularly, the present invention seeks to provide a roller screw mechanism that has an increased service life and in which, for a given axial bulk, the loading capacity is increased.

The present invention also seeks to provide a roller screw mechanism that has a design suitable for a wide variety of pitches of the mechanism.

In one embodiment, the roller screw mechanism comprises a screw comprising an outer thread, a nut disposed around and coaxially with the screw, the nut comprising an inner thread, and a plurality of rollers that are disposed radially between the screw and the nut and are each provided with an outer thread engaged with the outer and inner threads of the screw and of the nut and with two outer gear teeth.

The mechanism also comprises two synchronizing gear teeth that are each engaged with one of the gear teeth of the rollers. The outside diameter of each gear teeth of each roller is less than the diameter of the root of the thread of the roller. Each tooth of the gear teeth of the rollers comprises planar faces that engage with the synchronizing gear teeth.

Advantageously, each tooth of the gear teeth of the rollers may comprise a connecting radius between each planar face and a top of the tooth.

Preferably, each tooth of the synchronizing gear teeth comprises flanks that have a convex profile in cross section that engages with the planar faces of the teeth of the gear teeth of the rollers.

Advantageously, the planar faces of each tooth of the gear teeth of the rollers are symmetrical to one another with respect to a median radial plane of the tooth that passes through an elongation axis of the roller. The circumferentially opposite planar faces of adjacent teeth of the gear teeth of each roller may be connected together by a concave bottom.

In one embodiment, each roller comprises a groove situated axially between the thread and each gear teeth.

In one embodiment, the mechanism comprises ring gears that are fixed to the nut and each comprise one of the synchronizing gear teeth. Alternatively, the synchronizing gear teeth may be formed on the nut.

In another embodiment, the synchronizing gear teeth are formed on the screw. Alternatively, the mechanism may comprise ring gears that are fixed to the screw and each comprise one of the synchronizing gear teeth.

The invention also relates to an actuating cylinder comprising a means for driving in rotation and a roller screw mechanism as defined above, the screw of the mechanism being coupled to the driving means.

The invention also relates to a method for manufacturing a roller of a roller screw mechanism comprising an outer thread and two outer gear teeth that are disposed axially on either side of the thread. The method comprises steps of removing material with the aid of at least one radially acting tool in order to form the outer gear teeth such that the outside diameter of each gear teeth is less than the diameter of the root of the outer thread and that each tooth of the gear teeth comprises planar faces.

According to one method of implementation, the steps of removing material in order to form the outer gear teeth of the roller are carried out simultaneously with the steps of removing material in order to form the outer thread of the roller. Advantageously, the steps of removing material in order to form the outer gear teeth and/or to form the outer thread are carried out by rolling.

BRIEF DESCRIPTION OF THE FIGURES

The present invention will be better understood from reading the detailed description of a number of embodiments which are given by way of entirely nonlimiting example and are illustrated by the appended drawings, in which:

FIG. 3 is a view in section on the line III-III in FIG. 2;

FIG. 4 is a detail view of FIG. 3;

FIGS. 6 and 7 are views in axial section of roller screw mechanisms according to second and third exemplary embodiments of the invention.

DETAILED DESCRIPTION OF THE EMBODIMENTS

Figure 1:
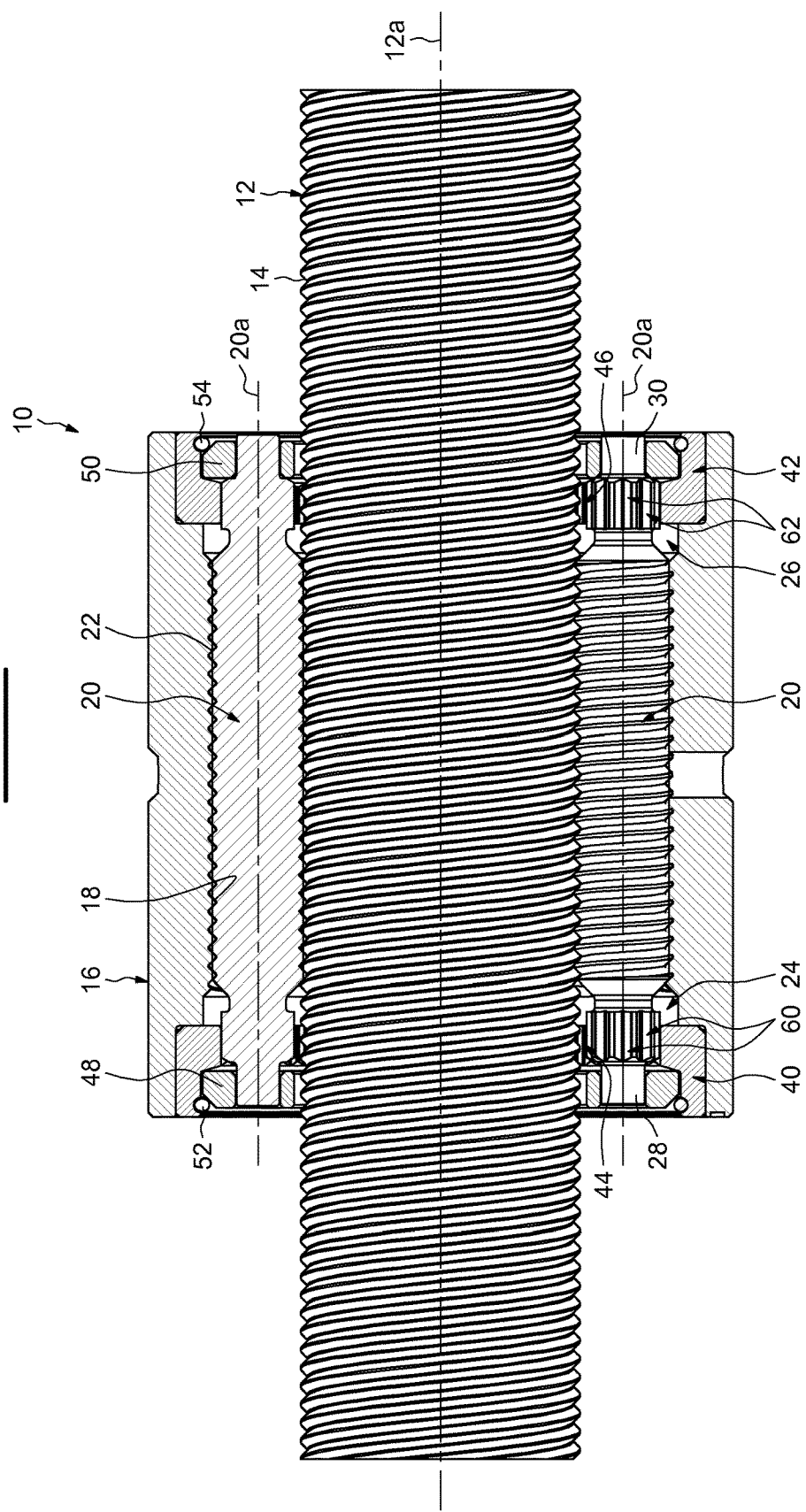
FIG. 1 is a view in axial section of a roller screw mechanism according to a first exemplary embodiment of the invention.

In FIG. 1, the planetary roller screw mechanism 10 comprises a screw 12, of axis 12a, provided with an outer thread 14, a nut 16 mounted coaxially around the screw 12 and provided with an inner thread 18, the inside diameter of which is greater than the outside diameter of the thread 14, and a plurality of longitudinal rollers 20 disposed radially between the screw and the nut. The screw 12 extends longitudinally through a cylindrical bore of the nut 16, on which the inner thread 18 is formed.

The rollers 20 are identical to one another and distributed regularly around the screw 12. Each roller 20 extends along an axis 20a parallel to the axis 12a of the screw and comprises an outer thread 22 engaged with the thread 14 of the screw and the thread 18 of the nut.

Figure 2:
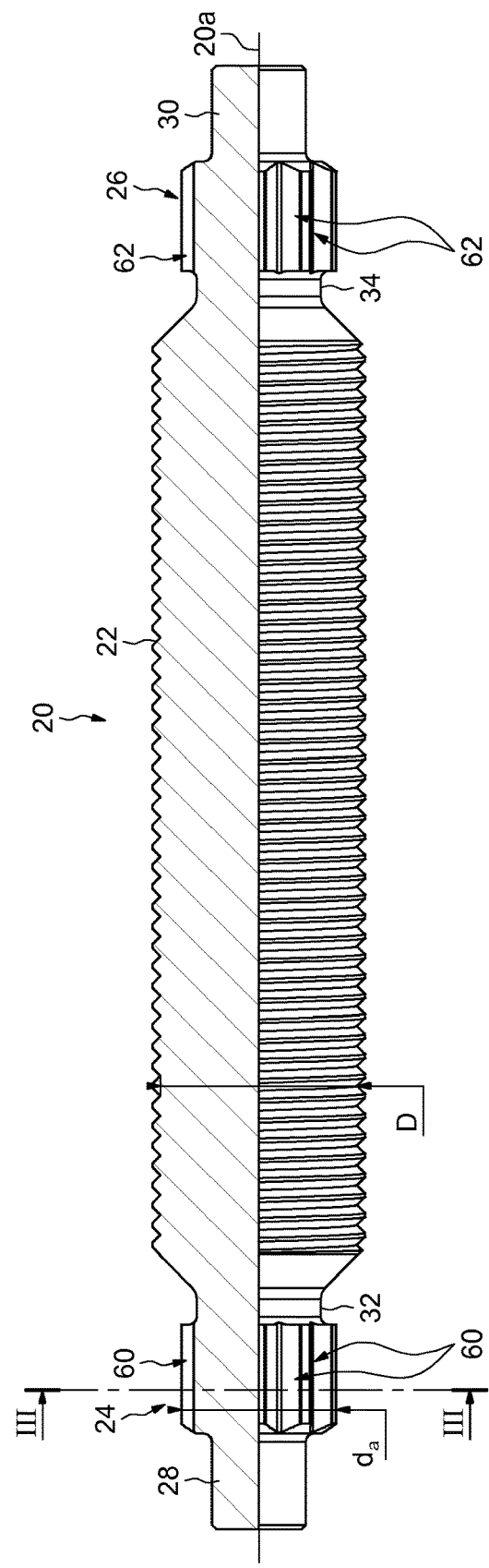
FIG. 2 is a view in half axial section of a roller of the mechanism in FIG. 1.

As illustrated more clearly in FIG. 2, each roller 20 comprises, at each end, an outer gear teeth 24, 26 and a cylindrical journal 28, 30 extending axially towards the outside from the gear teeth. The gear teeth 24, 26 are disposed axially on either side of the outer thread 22. The gear teeth 24, 26 are identical to one another. Each roller 20 also comprises an annular outer groove 32, 34 formed axially between the thread 22 and each gear teeth 24, 26. The thread 22 is situated axially between the grooves 32, 34. Each gear teeth 24, 26 is delimited axially by the associated groove 32, 34 and the corresponding journal 28, 30. As will be described in more detail below, the outside diameter of each gear teeth 24, 26 of each roller is less than the diameter D of the root of the thread 22.

Referring again to FIG. 1, the mechanism 10 also comprises two annular ring gears 40, 42 that are each fixed in a non-threaded part of the bore of the nut 16 and each comprise an inner gear teeth 44, 46 respectively engaged with the gear teeth 24, 26 of the rollers for the synchronization thereof. Each ring gear 40, 42 is mounted in a manner axially bearing against a radial shoulder of the nut 16 formed between the inner thread 18 and the associated non-threaded part of the bore of the nut. The ring gears 40, 42 are identical to one another.

The mechanism 10 also comprises two annular rings 48, 50 that are each mounted radially between the thread 14 of the screw and the associated ring gear 40, 42. Each ring 48, 50 is mounted axially in the bore (unreferenced) of the associated ring gear 40, 42 in a manner mounted freely in the circumferential direction with respect to the ring. Each ring 48, 50 comprises a plurality of cylindrical through-cavities (unreferenced) which are distributed regularly in the circumferential direction and inside which the journals 28, 30 of the rollers are accommodated. The rings 48, 50 support the rollers 20 and maintain the regular circumferential spacing thereof. The mechanism 10 also comprises retaining rings 52, 54 that are each mounted in a groove (unreferenced) formed in the bore of the associated ring gear 40, 42 and are intended to axially retain the corresponding ring 48, 50.

Referring again to FIG. 2, the gear teeth 24, 26 of each roller each comprise a plurality of radial teeth 60, 62 that are identical to one another and spaced apart from one other in a regular manner in the circumferential direction. The teeth 60, 62 extend axially. Since the gear teeth of each roller 20 are identical, only the gear teeth 24 will be described here.

As illustrated more clearly in FIG. 3, each tooth 60 of the gear teeth 24 comprises two opposite planar bearing flanks or faces 60a, 60b and a top 60c connecting the large-diameter ends of the faces. In the exemplary embodiment illustrated, the top 60c of each tooth is flat. The faces 60a, 60b delimit the associated tooth in the circumferential direction. The faces 60a, 60b of each tooth have a rectilinear profile in cross section. The faces 60a, 60b of each tooth are inclined with respect to a median plane P of the tooth passing through the axis 20a of the roller in two opposite directions. In the exemplary embodiment illustrated, the faces 60a, 60b of each tooth are symmetrical to one another when considering the median plane P. Each tooth 60 has a trapezoidal profile in cross section. The face 60a of one tooth is circumferentially opposite the face 60b of the immediately adjacent tooth, the faces being connected together by a concave bottom 60d. In the exemplary embodiment illustrated, the number of teeth 60 is equal to ten. Alternatively, a different, even or odd, number of teeth could be provided.

As illustrated more clearly in FIG. 4, each tooth 60 of the gear teeth 24 comprises a connecting radius 60e provided between each face 60a, 60b and the associated top 60c. Each connecting radius 60e is convex. The design of the faces 60a, 60b that each have a planar shape makes it possible to provide a connecting radius 60e between each of the faces and the top 60c of the tooth. The presence of sharp edges on the teeth 60 is thus avoided. This makes it possible to avoid premature wear to the synchronizing gear teeth 44, 46 of the ring gears.

Referring again to FIG. 3, the outside diameter da of the gear teeth 24 corresponds to the circle passing through the tops 60c of the teeth. This is also referred to as the head diameter. As indicated above, this outside diameter da of the gear teeth 24 of each roller is less than the diameter D (FIG. 2) of the root of the thread 22.

With such a ratio between the outside diameter da of each gear teeth 24, 26 of each roller and the diameter D of the root of the thread 22 of the roller, no thread is formed on each of these gear teeth during operations of removing material that are carried out in order to machine the thread 22. This makes it possible to avoid premature wear to the synchronizing gear teeth 44, 46 of the ring gears.

Moreover, the design of the teeth 60, 62 of the gear teeth 24, 26 of each roller having opposite planar faces makes it possible to be able to form these teeth by deformation in the radial direction of the material, using a radially acting tool, when considering the axis 20a of the roller. The gear teeth 24, 26 may advantageously be formed by rolling. The use of a radially acting tool to form the gear teeth 24, 26 of each roller is particularly advantageous inasmuch as it is not necessary to provide an axial clearance for the tool between each gear teeth 24, 26 of the roller and the associated thread 22.

For each roller 20, the axial distance that separates each gear teeth 24, 26 from the associated thread 22 can therefore be reduced. For a given length of the roller 20, the length of the thread 22 can thus be increased. This makes it possible to increase the loading capacity and also the axial and radial rigidities of the mechanism 10 for a given axial bulk.

In the exemplary embodiment illustrated, the groove 32, 34 situated axially between the thread 22 and each gear teeth 24, 26 is provided in order to allow upsetting of material during the steps of removing material by way of the radially acting tool. Each groove 32, 34 may have a different shape or else have a smaller axial size so as to be able to further increase the length of the thread 22.

Advantageously, the steps of removing material in order to form the two gear teeth 24, 26 of each roller can be carried out simultaneously, by two different tools or by a single tool. Provision can also be made to carry out these steps simultaneously with the machining operations which are provided in order to obtain the thread 22 and which can also be carried out by radial rolling.

Moreover, the planar shape of the faces of the teeth 60, 62 makes it possible to be able to obtain gear teeth 24, 26 that are suitable for a wide variety of pitches, even for relatively large pitches, on each of the rollers. By virtue of this planar shape of the faces of the teeth 60 and 62, it is possible to maintain an outside diameter da for the gear teeth 24, 26 of the roller that is less than the diameter D of the root of the thread 22, independently of the value of the pitch of the roller. This is not feasible with the conventional profile of roller gear teeth in the form of an involute of a circle for all possible pitches.

Figure 5:
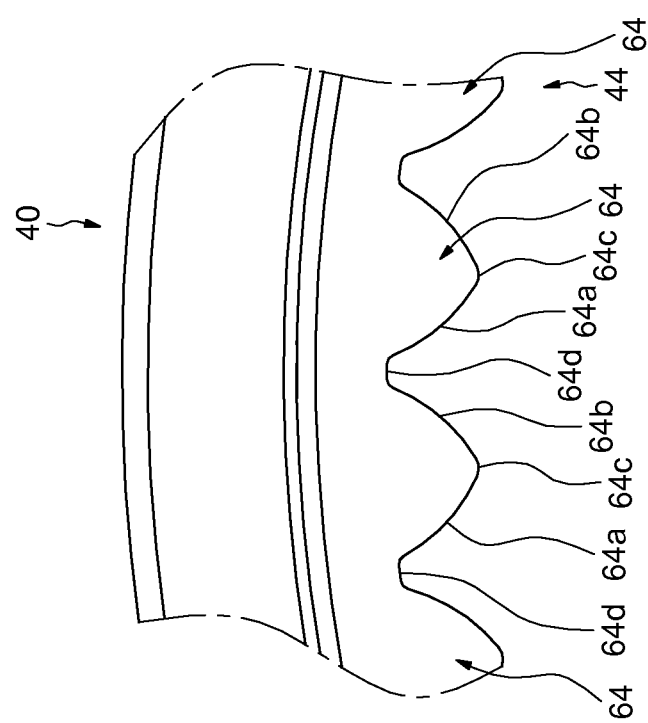
FIG. 5 is a detail view of a ring gear of the mechanism in FIG. 1.

As indicated above, the synchronizing gear teeth 44, 46 of the ring gears 40, 42 are identical to one another. Only the gear teeth 44 will be described in detail below. As illustrated in FIG. 5, the synchronizing gear teeth 44 comprises a plurality of radial teeth 64 that are identical to one another and spaced apart from one other in a regular manner in the circumferential direction. The teeth 64 extend axially and are directed radially towards the inside. Each tooth 64 comprises two opposite convex bearing flanks 64a, 64b and a top 64c connecting the large-diameter ends of the flanks. In the exemplary embodiment illustrated, the top 64c of each tooth is in the form of a radius. The flanks 64a, 64b delimit the associated tooth in the circumferential direction. Each of the flanks 64a, 64b of each tooth has a convex profile in cross section. Two successive teeth 64 are connected together in the circumferential direction by a bottom 64d.

In the exemplary embodiment illustrated, each flank 64a has a convex profile formed by a first hypocycloid in cross section and each flank 64b has a convex profile formed by a second hypocycloid. The first and second hypocyloids are symmetrical to one another when considering a median plane of each tooth 64 passing through the axis of the ring gear. As a variant, it may be possible to provide for the ring gear 40 teeth 64 that each have a convex profile formed by two symmetrical arcs of a circle in cross section, when considering a median plane of the tooth.

In operation, the lateral flanks 64a, 64b of the teeth of the synchronizing gear teeth 44 of the ring gear 40 engage by contact with the lateral faces 60a, 60b of the teeth of the gear teeth 24 of the rollers. In an identical manner, the flanks of convex shape of the teeth of the gear teeth 46 of the ring gear 42 bear against the planar faces of the teeth of the gear teeth 26 of the rollers in the circumferential direction.

During the transmission of forces, the planar faces of the teeth of the gear teeth 24, 26 of the rollers tend to deform locally at the points of contact with the convex flanks of the teeth of the synchronizing gear teeth 44, 46 of the ring gears. Under load, the faces of the teeth of the gear teeth 24, 26 of the rollers can thus locally have a slightly concave profile in cross section. During such deformation under load, a conjugate profile is obtained between the gear teeth 24, 26 of the rollers and the synchronizing gear teeth 44, 46 of the ring gears. This makes it possible to increase the contact areas between the gear teeth of the rollers 20 and of the ring gears 40, 42 and to reduce slip and wear. Moreover, the provision of the connecting radii on each tooth of the gear teeth 24, 26 of the rollers makes it possible to further reduce wear at the end of the meshing of each of the teeth 60, 62 of the rollers with the engaged tooth of the associated ring gear 40, 42.

Figure 6:
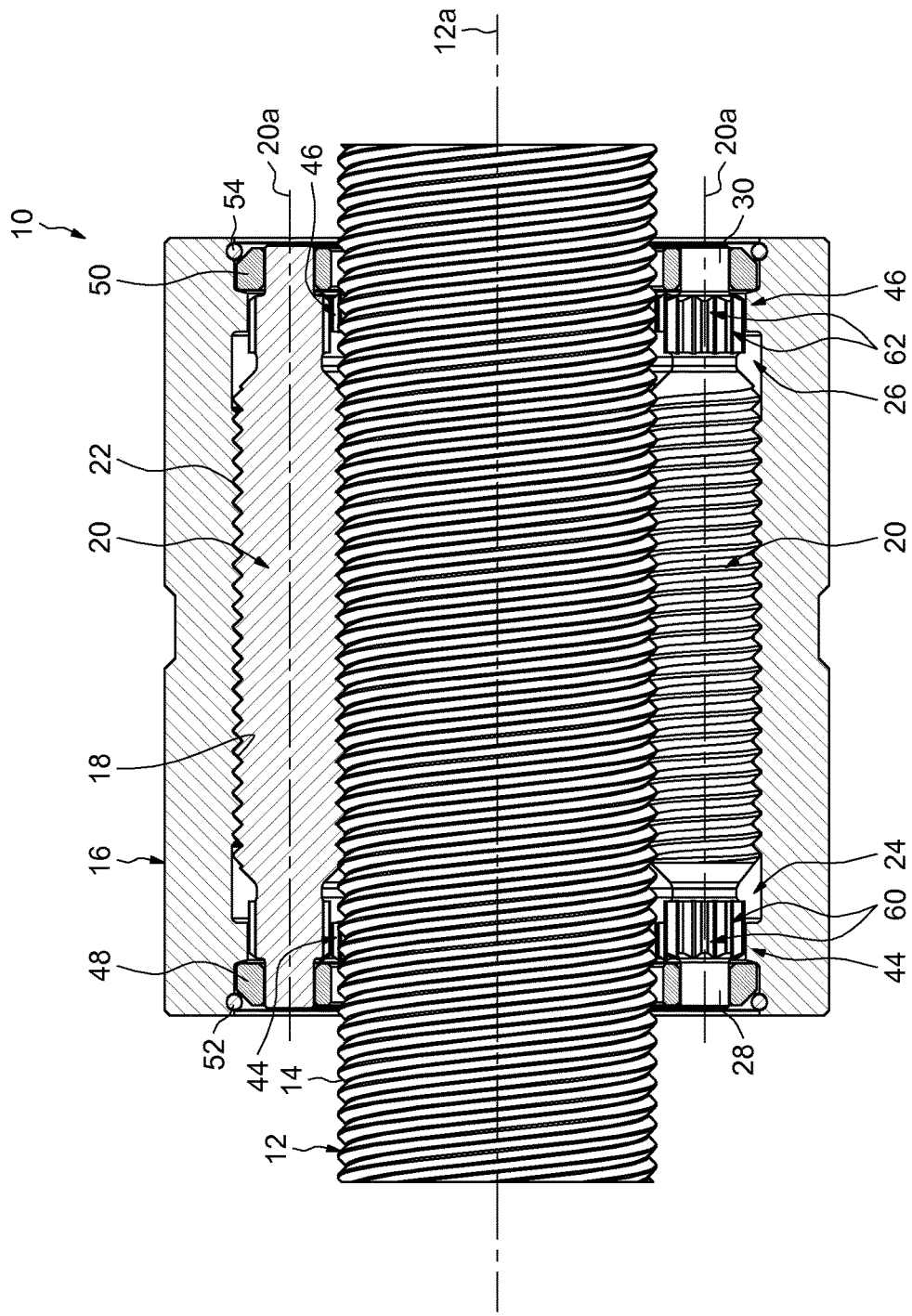

In the first example illustrated, each synchronizing gear teeth 44, 46 is formed on the associated ring gear 40, 42, which is itself attached and fixed to the nut 16. The exemplary embodiment illustrated in FIG. 6, in which identical elements bear the same references, only differs from this first example in that the synchronizing gear teeth 44, 46 are formed directly on the nut 16. The mechanism 10 does not have any ring gears fixed to the nut 16.

In the first two examples illustrated, the present invention was illustrated on the basis of a planetary roller screw mechanism. The exemplary embodiment illustrated in FIG. 7, in which identical elements bear the same references, only differs in that the mechanism 10 is of the inverted roller screw type. The design of the rollers 20 is strictly identical to that described above.

The screw 12 comprises two outer synchronizing gear teeth 70, 72 formed on the outer surface of the screw. The gear teeth 70, 72 are identical to one another and disposed axially on either side of the thread 14. The gear teeth 70, 72 is respectively engaged with the gear teeth 24, 26 of the rollers for the synchronization thereof. Each gear teeth 70, 72 comprises a plurality of radial teeth 74, 76 that are identical to one another and spaced apart from one other in a regular manner in the circumferential direction. The teeth 74, 76 extend axially and are directed radially towards the outside. Each tooth 74, 76 comprises two opposite convex bearing flanks and a top connecting the large-diameter ends of the flanks. Each of the flanks of each tooth has a convex profile in cross section. One of the flanks of each tooth may have a convex profile formed by a first epicycloid in cross section and the other flank may have a convex profile formed by a second epicycloid, it being possible for the first and second epicycloids to be symmetrical to one another when considering a median plane of the tooth. As a variant, it may be possible to provide teeth 74, 76 that each have a convex profile formed by two symmetrical arcs of a circle in cross section, when considering a median plane of the tooth. The rings 48, 50 are each mounted in this case radially between a non-threaded part of the outer surface of the screw 12 and the thread 18 of the nut. The retaining rings 52, 54 in this case have a smaller radial size and are each mounted in a groove (unreferenced) formed in the associated non-threaded part of the screw 12.

In this exemplary embodiment, the outer synchronizing gear teeth 70, 72 are formed directly on the screw. As a variant, it may be possible to provide ring gears that are attached to the outer surface of the screw and each comprise one of these synchronizing gear teeth.

What is claimed is:

1. A roller screw mechanism comprising:
a screw having:
an outer thread,
a nut disposed around and coaxially with the screw, the nut comprising an inner thread, and
a plurality of rollers that are disposed radially between the screw and the nut and are each provided with an outer thread engaged with the outer and inner threads of the screw and of the nut and with two outer gear teeth; and
two synchronizing gear teeth, wherein each of the two synchronizing gear teeth are engaged with one of the gear teeth of the rollers,
wherein an outside diameter of each gear teeth of each roller is less than a diameter of a root of the thread of the roller, each tooth of the gear teeth of the rollers comprising planar faces that engage with the synchronizing gear teeth,
wherein the synchronizing gear teeth are formed on the screw.

2. The mechanism according to claim 1, wherein each tooth of the gear teeth of the rollers further comprises a connecting radius between each planar face and a top of the tooth.

3. The mechanism according to claim 1, wherein each tooth of the synchronizing gear teeth further comprises flanks that have a convex profile in cross section that engages with the planar faces of the teeth of the gear teeth of the rollers.

4. The mechanism according to claim 1, wherein the planar faces of each tooth of the gear teeth of the rollers are symmetrical to one another with respect to a median radial plane of the tooth that passes through an elongation axis of the roller.

5. The mechanism according to claim 1, wherein the circumferentially opposite planar faces of adjacent teeth of the gear teeth of each roller are connected together by a concave bottom.

6. The mechanism according to claim 1, wherein each roller further comprises a groove situated axially between the thread and each gear teeth.

7. The mechanism according to claim 1, further comprising ring gears, wherein the ring gears are fixed to the nut and each comprise one of the synchronizing gear teeth.

8. The mechanism according to claim 1, wherein the synchronizing gear teeth are formed on the nut.

9. The mechanism according to claim 1, further comprises ring gears that are fixed to the screw and each comprising one of the synchronizing gear teeth.

10. An actuating cylinder comprising: a driving feature for driving in rotation and a roller screw mechanism, the roller screw mechanism comprising:
a screw having:
an outer thread,
a nut disposed around and coaxially with the screw, the nut comprising an inner thread, and
a plurality of rollers that are disposed radially between the screw and the nut and are each provided with an outer thread engaged with the outer and inner threads of the screw and of the nut and with two outer gear teeth; and
two synchronizing gear teeth, wherein each of the two synchronizing gear teeth are engaged with one of the gear teeth of the rollers,
wherein an outside diameter of each gear teeth of each roller is less than a diameter of a root of the thread of the roller, each tooth of the gear teeth of the rollers comprising planar faces that engage with the synchronizing gear teeth,
wherein the screw of the mechanism is coupled to the driving feature,
wherein the synchronizing gear teeth are formed on the screw.

* * * * *